US010466804B2

United States Patent
Murphy et al.

(10) Patent No.: US 10,466,804 B2
(45) Date of Patent: Nov. 5, 2019

(54) COMPOSITE UNIBODY KEYBOARD

(71) Applicant: Microsoft Technology Licensing, LLC, Redmond, WA (US)

(72) Inventors: Luke Michael Murphy, North Bend, WA (US); David Ian Rosen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/405,145

(22) Filed: Jan. 12, 2017

(65) Prior Publication Data

US 2018/0196477 A1    Jul. 12, 2018

(51) Int. Cl.
| | | |
|---|---|---|
| G06F 3/02 | (2006.01) | |
| G06F 1/16 | (2006.01) | |
| G06F 3/0354 | (2013.01) | |

(52) U.S. Cl.
CPC .......... G06F 3/0202 (2013.01); G06F 1/1669 (2013.01); G06F 3/03547 (2013.01)

(58) Field of Classification Search
CPC .. G06F 1/1666; G06F 3/03547; G06F 3/0202; G06F 1/1633; G06F 1/1662; G06F 1/1669
See application file for complete search history.

(56) References Cited

U.S. PATENT DOCUMENTS

| | | | | |
|---|---|---|---|---|
| 4,362,911 A | * | 12/1982 | Sears | H01H 13/702 200/5 A |
| 5,358,344 A | | 10/1994 | Spence | |
| 5,422,447 A | * | 6/1995 | Spence | B41J 5/12 200/343 |
| 5,493,654 A | * | 2/1996 | Gopher | G06F 3/0235 341/22 |
| 5,717,429 A | | 2/1998 | Coulon et al. | |
| 6,399,903 B1 | | 6/2002 | Stevenson | |
| 6,574,096 B1 | * | 6/2003 | Difonzo | G06F 1/1616 345/169 |
| 6,670,532 B2 | | 12/2003 | Maehara | |

(Continued)

FOREIGN PATENT DOCUMENTS

| | | |
|---|---|---|
| CN | 10043525 A | 10/2004 |
| CN | 101856876 A | 10/2010 |

(Continued)

OTHER PUBLICATIONS

"InduDur(TM) World's First Carbon-Fiber Keyboard", http://news.thomasnet.com/fullstory/carbon-fiber-keyboard-is-built-for-durability-564172, Published on: Jul. 1, 2009, 5 pages.

(Continued)

*Primary Examiner* — Patrick F Marinelli
(74) *Attorney, Agent, or Firm* — Holzer Patel Drennan

(57) ABSTRACT

The presently disclosed technology includes a composite unibody keyboard that both serves as a bottom case and a top bezel in traditional keyboard design. The unibody keyboard is made of a high-rigidity composite material with varying thicknesses to achieve predetermined design specifications for the keyboard. Areas of the unibody keyboard frame are removed to accommodate various electronic or other components of the keyboard prior to final assembly.

14 Claims, 5 Drawing Sheets

(56) References Cited

U.S. PATENT DOCUMENTS

| | | | | |
|---|---|---|---|---|
| 8,498,100 | B1* | 7/2013 | Whitt, III | G06F 1/1618 361/679.17 |
| 8,699,215 | B2* | 4/2014 | Whitt, III | G06F 1/1618 361/679.21 |
| 8,724,302 | B2* | 5/2014 | Whitt, III | G06F 1/1618 361/679.09 |
| 8,791,382 | B2* | 7/2014 | Whitt, III | G06F 1/1618 200/512 |
| 8,854,799 | B2* | 10/2014 | Whitt, III | G06F 1/1618 361/679.02 |
| 8,896,993 | B2* | 11/2014 | Belesiu | G06F 1/1618 361/679.08 |
| 9,064,654 | B2* | 6/2015 | Whitt, III | H01H 13/704 |
| 9,111,703 | B2* | 8/2015 | Whitt, III | H01H 13/704 |
| 9,146,620 | B2* | 9/2015 | Whitt, III | G06F 1/1618 |
| 9,158,384 | B2* | 10/2015 | Whitt, III | G06F 1/1618 |
| 9,229,537 | B2* | 1/2016 | Chen | G06F 3/0202 |
| 9,720,453 | B2* | 8/2017 | Nelson | G06F 1/1681 |
| 9,759,854 | B2* | 9/2017 | Harley, Jr. | G06F 1/1632 |
| 9,793,073 | B2* | 10/2017 | Marwah | H01H 13/704 |
| 9,823,705 | B2* | 11/2017 | Rosen | E05D 3/02 |
| 9,883,583 | B2* | 1/2018 | Cousins | H05K 1/111 |
| 2003/0002901 | A1 | 1/2003 | Sellers | |
| 2008/0138136 | A1* | 6/2008 | Sauvage | G06F 3/0216 400/488 |
| 2009/0189028 | A1* | 7/2009 | Depay | G06F 3/0202 248/118.1 |
| 2010/0245258 | A1* | 9/2010 | Stewart | G06F 3/03547 345/173 |
| 2011/0180557 | A1* | 7/2011 | Kenney | B29C 45/0055 220/669 |
| 2013/0168214 | A1* | 7/2013 | Liou | H01H 13/705 200/5 A |
| 2013/0228435 | A1* | 9/2013 | Whitt, III | H01H 13/704 200/5 A |
| 2013/0229354 | A1* | 9/2013 | Whitt, III | G06F 1/1618 345/169 |
| 2013/0229356 | A1* | 9/2013 | Marwah | H01H 13/704 345/170 |
| 2013/0328051 | A1* | 12/2013 | Franklin | H01L 29/786 257/59 |
| 2014/0016257 | A1* | 1/2014 | Matsuoka | H05K 5/03 361/679.26 |
| 2014/0169853 | A1* | 6/2014 | Sharma | G06F 3/0202 400/481 |
| 2014/0211393 | A1 | 7/2014 | Lee | |
| 2015/0092330 | A1 | 4/2015 | Kershek | |
| 2015/0185862 | A1* | 7/2015 | Chen | G06F 3/0202 361/679.08 |
| 2015/0228105 | A1* | 8/2015 | Harley, Jr. | G06T 15/04 345/583 |
| 2015/0251342 | A1* | 9/2015 | Schibsbye | B29C 44/12 264/46.5 |
| 2016/0037910 | A1 | 2/2016 | Ergun et al. | |
| 2016/0103503 | A1* | 4/2016 | Pham | G06F 3/0202 345/170 |
| 2016/0187933 | A1* | 6/2016 | Nelson | G06F 1/1681 361/679.11 |
| 2016/0320809 | A1* | 11/2016 | Rosen | E05D 3/02 |
| 2017/0010637 | A1* | 1/2017 | Garelli | G06F 1/203 |
| 2017/0045917 | A1* | 2/2017 | Rosen | E05D 3/02 |
| 2017/0060190 | A1* | 3/2017 | Hegde | B29C 59/02 |
| 2017/0060192 | A1* | 3/2017 | Cousins | H05K 1/111 |
| 2017/0293321 | A1* | 10/2017 | Rosen | G06F 1/1656 |
| 2018/0168027 | A1* | 6/2018 | Cousins | H05K 1/111 |
| 2018/0196477 | A1* | 7/2018 | Murphy | G06F 1/1666 |
| 2018/0284905 | A1* | 10/2018 | Hewett | G06F 3/0213 |

FOREIGN PATENT DOCUMENTS

| | | |
|---|---|---|
| CN | 103802323 A * | 5/2014 |
| EP | 0654727 A2 | 5/1995 |
| EP | 2479645 A1 | 7/2012 |
| WO | 2014099020 A1 | 6/2014 |

OTHER PUBLICATIONS

"International Search Report and Written Opinion Issued in PCT Application No. PCT/US2017/068851", dated May 8, 2018, 16 Pages.

* cited by examiner

COMPOSITE UNIBODY KEYBOARD

BACKGROUND

A computer keyboard is a typewriter-style device that uses an arrangement of keys representing symbols or functions as mechanical levers and electronic switches to convert physical operation of the individual keys into electronic signals that may be interpreted by a computing device to signify a user's selection of a symbol or function. As computing devices shrink in physical size and become more portable, keyboards associated with the computing devices also shrink accordingly. Further, when used in conjunction with a tablet computing device, many keyboards also function as a cover or a stand for the associated tablet computing device. Thus, the thickness of the keyboard may contribute to the overall thickness of the tablet computing device and is expected to be held to a minimum value.

SUMMARY

Implementations described and claimed herein provide a keyboard comprising a composite unibody frame having a palm rest area with a first frame thickness and a keypad area with a second frame thickness. The first frame thickness substantially differs from the second frame thickness and the composite unibody frame forms substantially an entire supporting structure for the keyboard.

Implementations described and claimed herein further provide a method of manufacturing a keyboard. The method includes forming a composite frame layup having a palm rest area with a first frame thickness and a keypad area with a second frame thickness. The first frame thickness substantially differs from the second frame thickness. The method further comprises curing the composite frame layup to create a composite unibody frame that forms substantially an entire supporting structure for the keyboard.

Implementations described and claimed herein still further provide a keyboard comprising a composite unibody frame having a palm rest area with a first frame thickness and a keypad area with a second frame thickness. The first frame thickness substantially differs from the second frame thickness and the composite unibody frame forms substantially the entire supporting structure for the keyboard. The keyboard further comprises a keypad attached to the keypad area of the composite unibody frame, a touchpad attached to the palm rest area of the composite unibody frame, and a back shim installed over one or more cavities in the composite unibody frame. The cavities contain one or more electronic components of the keyboard.

Other implementations are also described and recited herein.

BRIEF DESCRIPTIONS OF THE DRAWINGS

DETAILED DESCRIPTIONS

To effectively operate on surfaces that may not be entirely flat or rigid and reduce the likelihood of physically deflecting and damaging the keyboard, many keyboards incorporate a minimum stiffness specification to resist various bending and torsional loads. Maintaining the minimum stiffness specification becomes increasingly difficult as keyboard thickness is reduced. Therefore, consumer preferences and industry demands seek keyboard designs that maintain an acceptable minimum stiffness specification, while reducing overall keyboard thickness. The following composite unibody keyboards are intended to address some or all of the foregoing problems, as well as additional problems not specifically identified herein.

Figure 1:
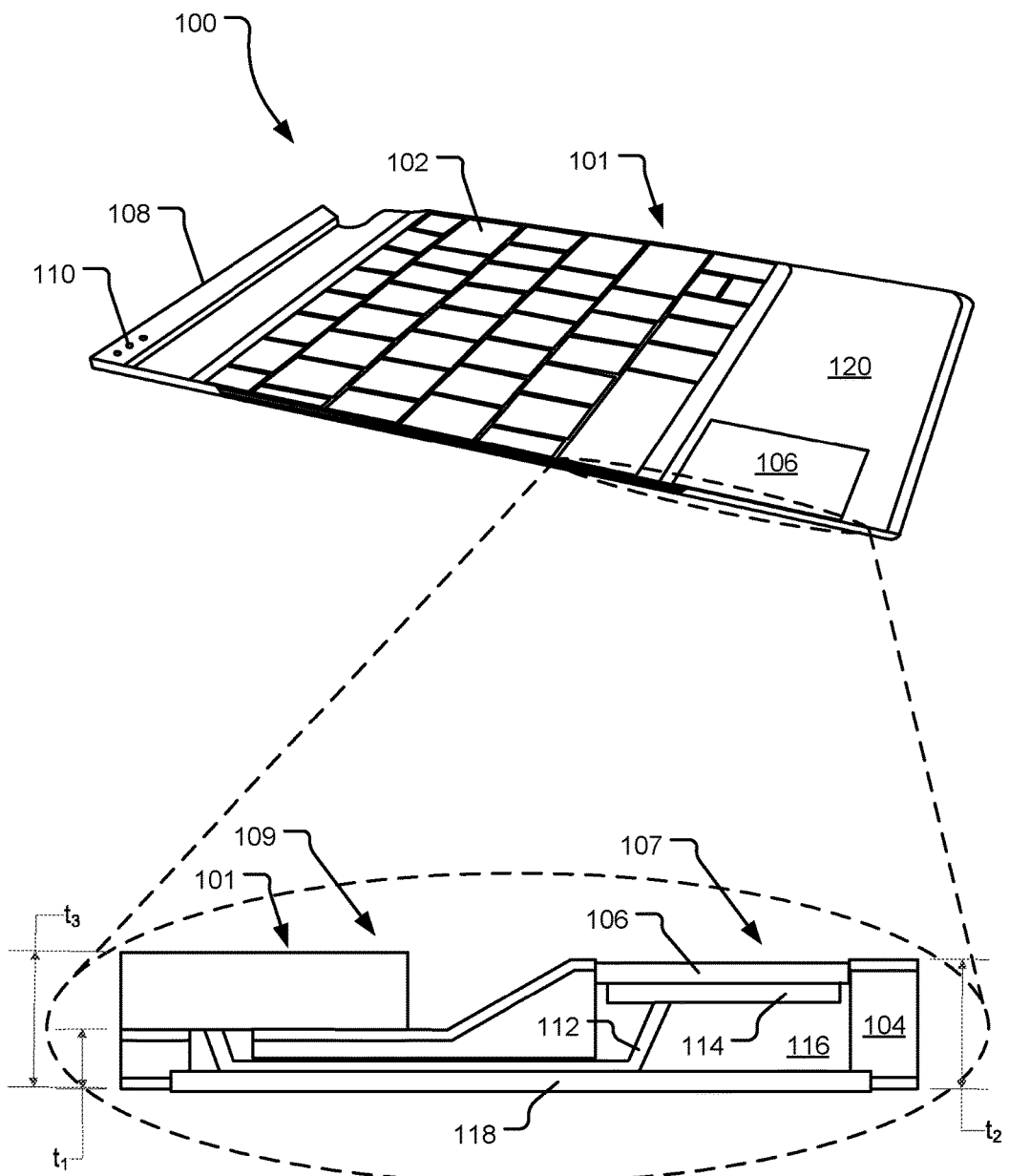
FIG. 1 illustrates a perspective sectional view and a detail elevation sectional view of an example composite unibody keyboard.

FIG. 1 illustrates a perspective sectional view and a detail elevation sectional view of an example composite unibody keyboard 100. The keyboard 100 includes a composite unibody frame 104 that forms the structure for the keyboard 100 and serves as a platform for attaching the various components of the keyboard 100 discussed in detail below. As compared to various prior art solutions, the unibody frame 104 functions as both a bottom case and a top bezel for the keyboard 100 and utilizes a composite material(s) meeting a predetermined stiffness requirement (e.g., having a high modulus of elasticity) to hold deflection of the keyboard 100 within an acceptance range in response to a variety of projected loads (e.g., various bending and torsional loads). In an example implementation, the high modulus of elasticity of the keyboard 100 exceeds 20 gigapascals. The frame 104 may be made from a variety of composite moldable materials meeting the predetermined stiffness requirement, as described in detail below.

The keyboard 100 further includes a hinge 108 that serves to physically and communicatively attach the keyboard 100 to an associated computing device (not shown). In various implementations, the computing device is a tablet computer, laptop computer, personal computer, gaming device, smart phone, or any other discrete device that carries out one or more specific sets of arithmetic and/or logical operations. The hinge 108 may take a variety of physical forms, including various sizes and shapes. In other implementations, the hinge 108 is omitted and the keyboard 100 is otherwise physically attached to the computing device or not physically attached to the computing device at all.

The keyboard 100 may be powered by and/or communicate with the computing device via contacts (e.g., contact 110) in the hinge 108 or communicate wirelessly over a variety of available communication standards (e.g., Bluetooth, infrared, near field communication, ultraband, and ZigBee). In various implementations, the keyboard 100 may have its own power supply (e.g., one or more batteries, not shown), be powered from the computing device via the hinge 108, or be powered wirelessly from the computing device or another power source.

The keyboard 100 further includes a keypad 101 containing an array of keys (e.g., key 102) arranged in a predetermined pattern (e.g., QWERTY) on and attached to a top side of the frame 104. Each key within the keypad 101 is communicatively connected to a flexible flat cable 112 that lies within a cavity 116 in the unibody frame 104.

The keyboard 100 still further includes a touchpad 106 (alternatively a trackpad or mousepad) also attached to the top side of the frame 104 and mounted to a printed circuit board 114 that converts user input on the touchpad 106 to corresponding electrical signals that may be interpreted by the computing device. The printed circuit board 114 is also communicatively connected to the cable 112, which is communicatively coupled to the contacts in the hinge 108. In other implementations, the cable 112 is communicatively coupled to another printed circuit board (not shown) that converts electrical signals sent from the keypad 101 and the touchpad 106 via the cable 112 to wireless signals that may be received by the computing device. In still other implementations, the keyboard 100 may include additional user interface components (e.g., dials, knobs, lights, displays, and sensors) that may or may not be connected to the cable 112. To the extent the additional user interface components are connected to the cable 112, a signal passing through the cable may communicate data from the additional user interface components to the computing device and/or from the computing device to the additional user interface components.

The keyboard 100 further still includes a back shim 118 attached to a back side of the frame 104 that serves to cover the cavity 116 and seal the cable 112, printed circuit board 114, back sides of the keypad 101 and the touchpad 106, as well as any associated electrical connections within the keyboard 100. The keyboard 100 may be covered by a fabric covering 120 that serves to further seal the interior of the keyboard 100 from contaminates and hides seams between the various components of the keyboard 100. In some implementations, two sheet of fabric are oriented on each side of the keyboard 100 and are laminated together to form the fabric covering 120. The fabric covering 120 may further offer a desirable tactile experience for the user. In other implementations, the fabric covering 120 is omitted.

Overall maximum keyboard 100 thickness $t_3$ is predefined pursuant to product development specifications. As a result, the unibody frame 104 may have varying thicknesses to accommodate the user interface components (e.g., the keypad 101 and the touchpad 106). The unibody frame 104 has at least two distinct overall thicknesses $t_1$, $t_2$. Unibody frame 104 thickness $t_1$ is oriented in an area occupied by the keypad 101 (referred to herein as keypad area 109) so that the overall keyboard 100 thickness in the keypad area 109 is maintained at or below thickness $t_3$. Similarly, unibody frame 104 thickness $t_2$ is oriented in an area occupied by the touchpad 106 (referred to herein as palm rest area 107) so that the overall keyboard 100 thickness in the palm rest area 107 is maintained at or below thickness $t_3$. Thus, an overall thickness $t_3$ of the keyboard 100 is maintained across substantially the entire keyboard 100.

Figure 2:
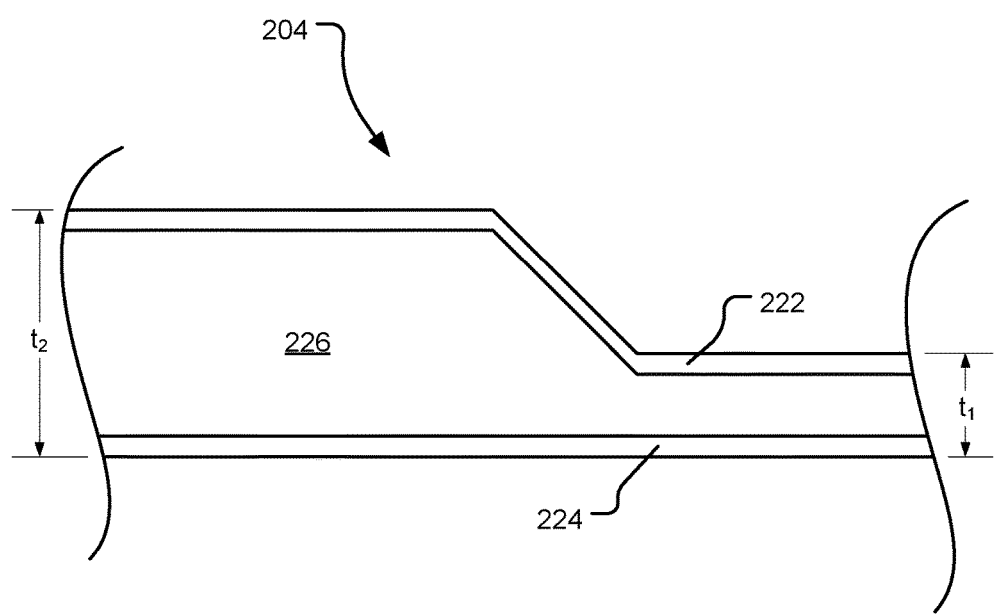
FIG. 2 illustrates a partial elevation sectional view of an example composite unibody frame for a keyboard.

FIG. 2 illustrates a partial elevation sectional view of an example composite unibody frame 204 for a keyboard (not shown, see e.g., keyboard 100 of FIG. 1). The frame 204 includes two stiff shell layers 222, 224 with a low-density core 226 oriented therebetween. The two stiff shell layers 222, 224 and the low-density core 226 form a sandwich-structured composite material where the low-density core 226 is bonded to the stiff shell layers 222, 224 with an adhesive or by brazing (in the case of metals) the layers together. Prior to curing (e.g., application of adhesive with heat and/or pressure), the composite unibody frame 204 may be referred to herein as a composite frame layup.

In various implementations, the stiff shell layers 222, 224 may each be made of a fibrous composite material. The fibrous composite material may include a woven, unidirectional (with a combination of at least two unidirectional layers with strands oriented at 90 degrees from one another, for example), or chopped fibers impregnated with a resin or polymer matrix. For example, glass, carbon, or Kevlar fibers may be impregnated with a thermoset or thermoplastic resin (e.g., a polyester or epoxy). Various example fibrous composite materials include polymer-matrix composites, fiber reinforced plastics, carbon fiber reinforced polymers, and metal composite material. In one example implementation, the stiff shell layers 222, 224 are each made of FR-4 printed circuit board. In other implementations, the stiff shell layers 222, 224 may each be made of solid sheet metal or plastic. The low-density core 226 may include various types of open or closed cell foams (e.g., polyvinylchloride, polyurethane, polyethylene, polystyrene, syntactic, or metal foams), paper, wood, or honeycomb structures.

The low-density core 226 material is a generally low strength and low weight material, but its relatively higher thickness moves the stiff shell layers 222, 224 away from a center (or neutral axis) of the frame 204, which allows the stiff shell layers 222, 224 to provide the frame 204 with high bending and torsional stiffness, while maintain an overall low density of the frame 204. Further, the low-density core 226 material may crush to accommodate a specific shape within the unibody frame 204. The low-density core 226 may also provide dimensional stability to the unibody frame 204 and help prevent unwanted warping of the unibody frame 204.

Overall maximum keyboard thickness is predefined pursuant to product development specifications. As a result, the unibody frame 204 may have varying thicknesses to accommodate various user interface components (e.g., a keyboard and a touchpad, not shown). The unibody frame 204 has two distinct overall thicknesses $t_1$, $t_2$. Unibody frame 204 thickness $t_1$ is oriented in an area to be occupied by a keypad so that the overall keyboard thickness in the keypad area is maintained at or below the predefined overall maximum keyboard thickness. Similarly, unibody frame 204 thickness $t_2$ is oriented in an area to be occupied by the touchpad (or wrist pad area) so that the overall keyboard thickness in the touchpad area is maintained at or below the predefined overall maximum keyboard thickness. Thus, an overall thickness of the keyboard is maintained at or below the predefined overall maximum keyboard thickness.

A combination of the low-density core 226 and the stiff shell layers 222, 224 and their respective thicknesses yields an average or effective density in each characteristic area of the composite unibody frame 204. For example, the effective density of the composite unibody frame 204 in an area intended to be occupied by a keypad (characterized by thickness $t_1$ in FIG. 2) has a higher density than an area intended to be occupied by the touchpad (characterized by thickness $t_2$ in FIG. 2). This is due to a relatively higher proportion of the denser stiff shell layers 222, 224 as compared to the less dense core 226 in the area characterized by thickness $t_1$ as compared to the area characterized by thickness $t_2$ in FIG. 2.

In an example implementation, the predefined overall maximum keyboard thickness is approximately 5 mm. The overall thicknesses $t_1$ and $t_2$ are approximately 1.1 mm and approximately 4.65 mm, respectively. The stiff shell layers 222, 224 are approximately 0.1 mm thick and the low-density core 226 has a varying thickness to achieve the overall thicknesses $t_1$, $t_2$. Here, the low-density core 226 in the area of the overall thickness $t_1$ is approximately 0.8 mm and the low-density core 226 in the area of the overall thickness $t_2$ is approximately 4.45 mm. In various implementations, approximate dimensions as defined herein are +/−10%. Other overall maximum keyboard thicknesses, thicknesses $t_1$, $t_2$, thickness of the stiff shell layers 222, 224 and the low-density core 226, as well as other dimensions of the keyboard are contemplated herein.

In another implementation, the composite unibody frame 204 is formed from a chopped fibrous layup (e.g., chopped fiberglass or carbon fiber slurry combined with a chopped polycarbonate or plastic). The chopped fibrous layup is compressed to the desired thicknesses (e.g., thicknesses $t_1$, $t_2$) in the desired locations (e.g., the keypad area and the palm rest area) and cured to hold the desired shape and thicknesses. As a result, the final density of the composite unibody frame 204 various depending on the thickness in a particular area of the composite unibody frame 204. Any reduction in stiffness of a less dense area of the composite unibody frame 204 may be offset by a greater thickness of the less dense area of the composite unibody frame 204.

Figure 3:
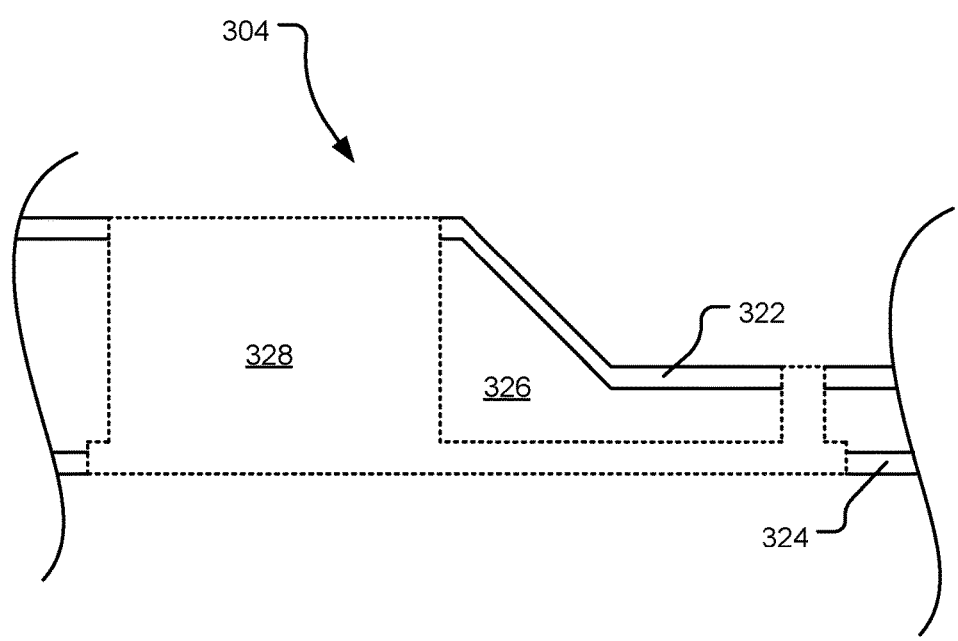
FIG. 3 illustrates a partial elevation sectional view of another example composite unibody frame for a keyboard.

FIG. 3 illustrates a partial elevation sectional view of another example composite unibody frame 304 for a keyboard (not shown, see e.g., keyboard 100 of FIG. 1). The frame 304 includes two stiff shell layers 322, 324 with a low-density core 326 of oriented therebetween. The two stiff shell layers 322, 324 and the low-density core 326 form a sandwich-structured composite material where the low-density core 326 is bonded to the stiff shell layers 322, 324, as described in detail with respect to frame 204 of FIG. 2. Further, the unibody frame 304 may have similar material constructions and dimensions to that described in detail with respect to frame 204 of FIG. 2.

Area (or cavity) 328 is removed from the unibody frame 304 so that the unibody frame 304 can accommodate various other components of the keyboard (e.g., touchpad 106, flexible flat cable 112, printed circuit board 114, and back shim 118 of FIG. 1), when assembled. In various implementations, the area 328 is removed from the unibody frame 304 using milling, routing, drilling, photochemical etching, multi-axis machining, and various combinations thereof. Additional mechanisms for removing the area 328 from the unibody frame 304 are contemplated herein.

Figure 4:
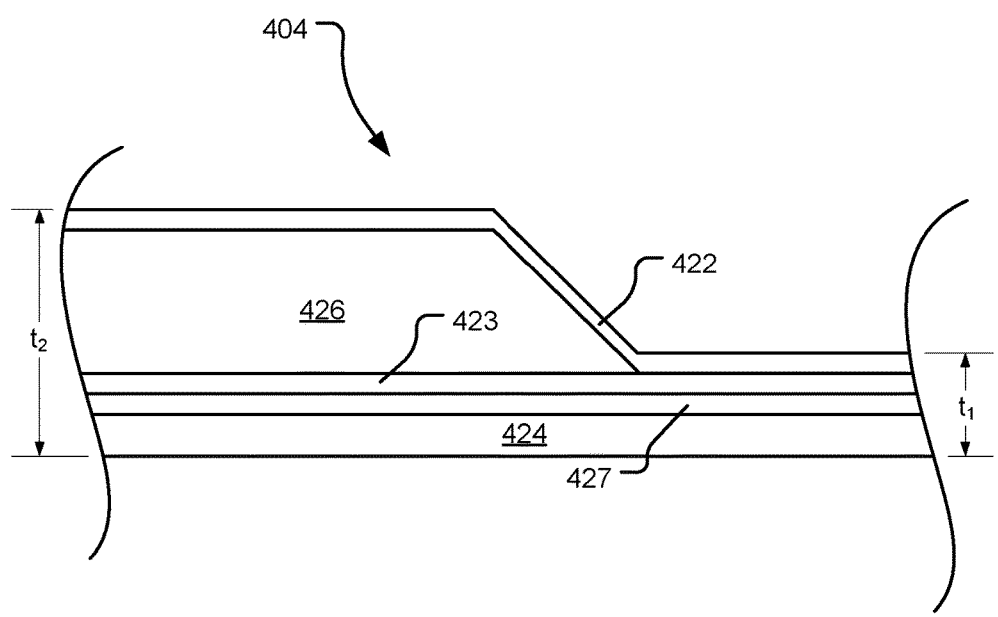
FIG. 4 illustrates a partial elevation sectional view of yet another example composite unibody frame for a keyboard.

FIG. 4 illustrates a partial elevation sectional view of yet another example composite unibody frame 404 for a keyboard (not shown, see e.g., keyboard 100 of FIG. 1). The frame 404 includes stiff layers 422, 423, 424 with low-density core layers 426, 427 oriented therebetween. The stiff layers 422, 423, 424 and the low-density core layers 426, 427 form a sandwich-structured composite material where the low-density core layers 426, 427 are bonded to the stiff layers 422, 423, 424, as described in detail with respect to frame 204 of FIG. 2. The stiff layer 423 can serve as a bridge layer between the stiff shell layers 422, 424 to distribute load and reduce the potential for warping the unibody frame 404, particularly during a curing step of the manufacturing process. Further, the unibody frame 404 may have similar material constructions to that described in detail with respect to frame 204 of FIG. 2.

Overall maximum keyboard thickness is predefined pursuant to product development specifications. As a result, the unibody frame 404 may have varying thicknesses to accommodate various user interface components (e.g., a keyboard and a touchpad, not shown). The unibody frame 404 has two distinct overall thicknesses $t_1$, $t_2$. Unibody frame 404 thickness $t_1$ is oriented in an area to be occupied by a keypad so that the overall keyboard thickness in the keypad area is maintained at or below the predefined overall maximum keyboard thickness. Similarly, unibody frame 404 thickness $t_2$ is oriented in an area to be occupied by the touchpad so that the overall keyboard thickness in the touchpad area is maintained at or below the predefined overall maximum keyboard thickness. Thus, an overall thickness of the keyboard is maintained at or below the predefined overall maximum keyboard thickness.

A combination of the low-density core layers 426, 427 and the stiff layers 422, 423, 424 and their respective thicknesses yields an average or effective density in each characteristic area of the composite unibody frame 404. For example, the effective density of the composite unibody frame 404 in an area intended to be occupied by a keypad (characterized by thickness $t_1$ in FIG. 4) has a higher density than an area intended to be occupied by a touchpad (characterized by thickness $t_2$ in FIG. 4). This is due to a relatively higher proportion of the denser stiff layers 422, 423, 424 as compared to the less dense core layers 426, 427 in the area characterized by thickness $t_1$ as compared to the area characterized by thickness $t_2$ in FIG. 4.

In an example implementation, the predefined overall maximum keyboard thickness is approximately 5 mm. The overall thicknesses $t_1$ and $t_2$ are approximately 1.1 mm and approximately 4.65 mm, respectively. The stiff layers 422, 423 are each approximately 0.1 mm thick and the stiff layer 424 is approximately 0.2 mm thick. The low-density core layer 427 is approximately 0.7 mm thick and the low-density core 426 has a varying thickness to achieve overall thicknesses $t_1$, $t_2$. The low-density core 426 in the area of overall thickness $t_1$ is approximately 0.0 mm and the low-density core 426 in the area of overall thickness $t_2$ is approximately 3.55 mm. Other overall maximum keyboard thicknesses, thicknesses $t_1$, $t_2$, thickness of the stiff layers 422, 423, 424 and the low-density core layers 426, 427, as well as other dimensions of the keyboard are contemplated herein.

One or more areas may be removed from the unibody frame 404 so that the unibody frame 404 can accommodate various other components of the keyboard (e.g., touchpad 106, flexible flat cable 112, printed circuit board 114, and back shim 118 of FIG. 1) when assembled, as described in detail with regard to unibody frame 304 of FIG. 3.

Figure 5:
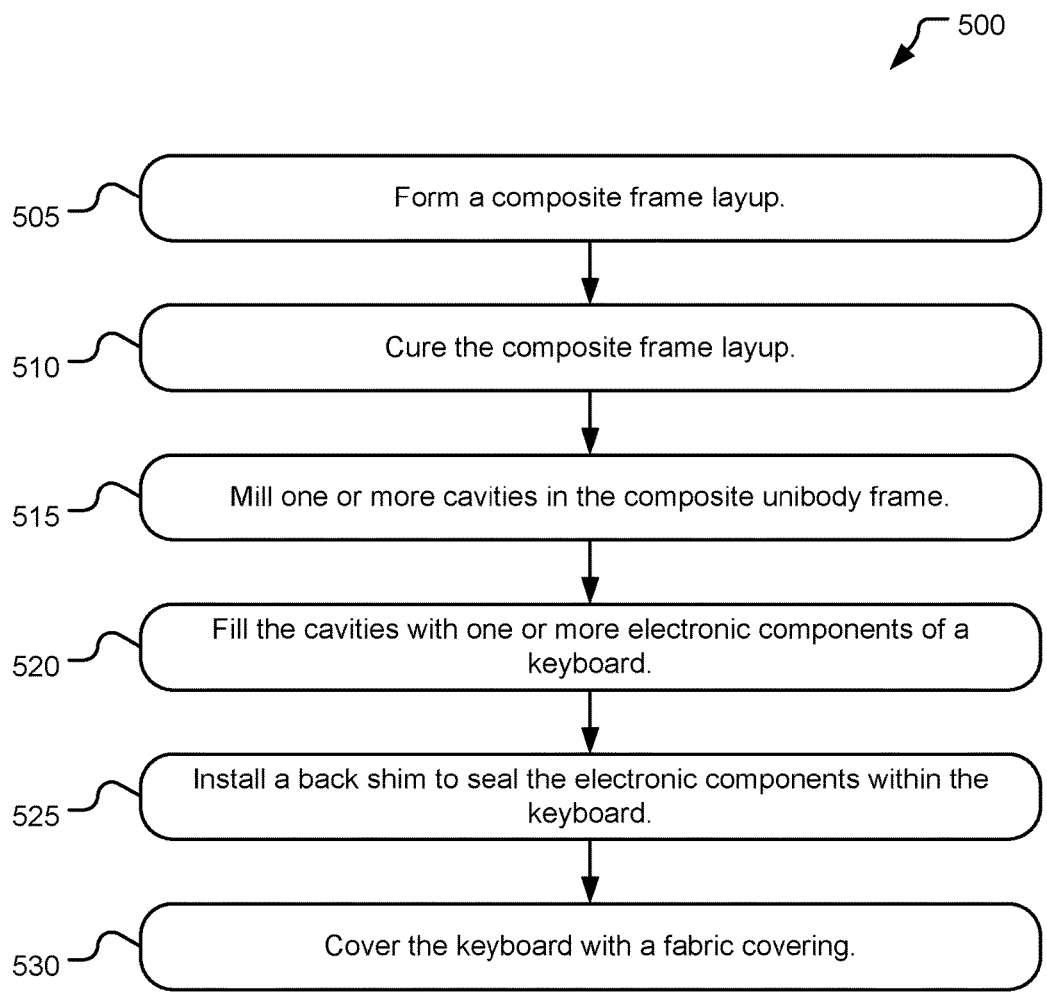
FIG. 5 illustrates example operations for manufacturing a composite unibody keyboard.

FIG. 5 illustrates example operations 500 for manufacturing a composite unibody keyboard. A forming operation 505 forms a composite frame layup. In some implementations, the composite frame layup includes two or more layers of thin fabric impregnated with a binder combined with one or more layers of foam. In other implementations, the composite frame layup includes a fibrous composite material crushed to a desired shape. In still other implementations, composite frame layup is a sandwich-structured composite layup. Various combinations of potential composite frame layup constructions are also contemplated herein.

A curing operation 510 cures the composite frame layup to form a composite unibody frame. In various implementations, the curing operation 510 involves applying one or both of heat and pressure to the composite frame layup for a time period sufficient to fully cure the composite frame layup. In implementations where the composite frame layup includes a stack of layers (e.g., a sandwich-structured layup), the curing operation 510 bonds each of the layers to one another and the material ceases to behave as a stack of individual layers and takes on properties of the composite material. In implementations where the composite frame layup includes a crushable fibrous composite material, the curing operation 510 melts and fuses chopped polycarbonate or plastic within the fibrous composite material together to form the rigid composite unibody frame.

In some implementations, multiple composite unibody frames may be cured simultaneously by stacking and curing the stack of multiple composite frame layups at once (referred to herein as stack molding). In an example implementation, four to eight composite frame layups are stacked and cured for three to four minutes. This increases effective throughput to less than one minute of cure time per composite frame layup. Specific temperatures, pressures, and times for performing the curing operation 510 are dependent on the materials used in the composite frame layup and may vary widely. For example, a thermoplastic resin may cure within 2-5 minutes, while a thermosetting resin may take 6-16 minutes to cure.

A milling operation 515 mills one or more cavities in the composite unibody frame. A filling operation 520 fills the cavities with one or more electronic or other components of the keyboard. These components may include, for example, a touchpad, flexible flat cabling, printed circuit board(s), batteries, and lights. Some or all of the electronic or other components may also be attached to the composite unibody frame to hold them in place.

An installing operation 525 installs a back shim to seal the electronic components within the keyboard. In various implementations, the back shim may be slip-fit, press-fit, glued, or screwed in place. A covering operation 530 covers the keyboard with a fabric covering. The fabric covering may conceal seams between the back shim and the composite unibody frame, as well as offer a desirable tactile experience for a user.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

An example keyboard according to the presently disclosed technology includes a composite unibody frame having a palm rest area with a first frame thickness and a keypad area with a second frame thickness. The first frame thickness substantially differs from the second frame thickness and the composite unibody frame forms substantially an entire supporting structure for the keyboard.

In another example keyboard according to the presently disclosed technology, the composite unibody frame in the palm rest area has a first effective density and the composite unibody frame in the keypad area has a second effective density. The first effective density substantially differs from the second effective density.

In another example keyboard according to the presently disclosed technology, the composite unibody frame includes at least two stiff shell layers and at least one low-density core layer.

In another example keyboard according to the presently disclosed technology, the stiff shell layers are a fibrous composite material.

In another example keyboard according to the presently disclosed technology, the fibrous composite material includes one or more of woven, unidirectional, and chopped fibrous material.

In another example keyboard according to the presently disclosed technology, the low-density core layer is a foam.

In another example keyboard according to the presently disclosed technology, the composite unibody frame is a sandwich-structured composite.

In another example keyboard according to the presently disclosed technology, the composite unibody frame is made of a substantially uniform compressed chopped fibrous material. Further, the fibrous material in the palm rest area has a first density and the fibrous material in the keypad area has a second density. The first density substantially differs from the second density.

An example method of manufacturing a keyboard according to the presently disclosed technology includes forming a composite frame layup having a palm rest area with a first frame thickness and a keypad area with a second frame thickness. The first frame thickness substantially differs from the second frame thickness. The method further includes curing the composite frame layup to create a composite unibody frame that forms substantially an entire supporting structure for the keyboard.

In another example method of manufacturing a keyboard according to the presently disclosed technology, the method further includes milling one or more cavities in the composite unibody frame.

In another example method of manufacturing a keyboard according to the presently disclosed technology, the method further includes filling the one or more cavities in the composite unibody frame with one or more electronic components of the keyboard.

In another example method of manufacturing a keyboard according to the presently disclosed technology, the method further includes installing a back shim over the cavities to seal the electronic components within the keyboard.

In another example method of manufacturing a keyboard according to the presently disclosed technology, the method further includes covering the keyboard with a fabric covering.

In another example method of manufacturing a keyboard according to the presently disclosed technology, the composite unibody frame in the palm rest area has a first effective density and the composite unibody frame in the keypad area has a second effective density. The first effective density substantially differs from the second effective density.

In another example method of manufacturing a keyboard according to the presently disclosed technology, the composite unibody frame includes at least two stiff shell layers and at least one low-density core layer.

In another example method of manufacturing a keyboard according to the presently disclosed technology, the stiff shell layers are made of a fibrous composite material.

In another example method of manufacturing a keyboard according to the presently disclosed technology, the low-density core layer is made of a foam.

In another example method of manufacturing a keyboard according to the presently disclosed technology, the composite unibody frame is made of a substantially uniform compressed chopped fibrous material. The fibrous material in the palm rest area has a first density and the fibrous material in the keypad area has a second density and the first density substantially differs from the second density.

An example keyboard according to the presently disclosed technology includes a composite unibody frame having a palm rest area with a first frame thickness and a keypad area with a second frame thickness. The first frame thickness substantially differs from the second frame thickness and the composite unibody frame forms substantially the entire supporting structure for the keyboard. The keyboard further includes a keypad attached to the keypad area of the composite unibody frame. The keyboard further includes a touchpad attached to the palm rest area of the composite unibody frame. The keyboard further includes a back shim installed over one or more cavities in the composite unibody frame. The cavities contain one or more electronic components of the keyboard.

In another example keyboard according to the presently disclosed technology, the composite unibody frame in the palm rest area has a first effective density and the composite unibody frame in the keypad area has a second effective density. The first effective density substantially differs from the second effective density.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A keyboard comprising:
a composite unibody frame having a keypad area with a first frame thickness and first effective density and a palm rest area with a second frame thickness and second effective density, the first frame thickness and first effective density substantially differing from the second frame thickness and second effective density, wherein the composite unibody frame forms substantially an entire supporting structure for the keyboard, and wherein the composite unibody frame includes at least two stiff shell layers and at least one low-density core layer;
a keypad attached to a top side of the composite unibody frame in the keypad area;
one or more electronic components oriented within a cavity formed in the composite unibody frame; and
a back shim attached to a back side of the composite unibody frame and covering the cavity.

2. The keyboard of claim 1, wherein the stiff shell layers are a fibrous composite material.

3. The keyboard of claim 2, wherein the fibrous composite material includes one or more of woven, unidirectional, and chopped fibrous material.

4. The keyboard of claim 1, wherein the low-density core layer is a foam.

5. The keyboard of claim 1, wherein the composite unibody frame is a sandwich-structured composite.

6. The keyboard of claim 1, wherein the composite unibody frame is made of a substantially uniform compressed chopped fibrous material, and wherein the fibrous material in the palm rest area has a first density and the fibrous material in the keypad area has a second density, wherein the first density substantially differs from the second density.

7. The keyboard of claim 1, wherein the one or more electronic components include a touchpad.

8. A method of manufacturing a keyboard comprising:
forming a composite frame layup having a keypad area with a first frame thickness and first effective density and a palm rest area with a second frame thickness and second effective density, the first frame thickness and first effective density substantially differing from the second frame thickness and second effective density; and
curing the composite frame layup to create a composite unibody frame that forms substantially an entire supporting structure for the keyboard, and wherein the cured composite unibody frame includes at least two stiff shell layers and at least one low-density core layer;
milling one or more cavities in the composite unibody frame;
filling the one or more cavities in the composite unibody frame with one or more electronic components of the keyboard;
attaching a back shim to a back side of the composite unibody frame and covering the cavities; and
attaching a keypad to a top side of the composite unibody frame in the keypad area.

9. The method of claim 8, further comprising:
covering the keyboard with a fabric covering.

10. The method of claim 8, wherein the stiff shell layers are a fibrous composite material.

11. The method of claim 8, wherein the low-density core layer is a foam.

12. The method of claim 8, wherein the composite unibody frame is made of a substantially uniform compressed chopped fibrous material, and wherein the fibrous material in the palm rest area has a first density and the fibrous material in the keypad area has a second density, wherein the first density substantially differs from the second density.

13. A keyboard comprising:
a composite unibody frame having a keypad area with a first frame thickness and first effective density and a palm rest area with a second frame thickness and second effective density, the first frame thickness and first effective density substantially differing from the second frame thickness and second effective density, wherein the composite unibody frame forms substantially the entire supporting structure for the keyboard, and wherein the composite unibody frame includes at least two stiff shell layers and at least one low-density core layer;
a keypad attached to a top side of the composite unibody frame in the keypad area;
a touchpad oriented within a cavity formed in the composite unibody frame in the palm rest area; and
a back shim attached to a back side of the composite unibody frame and covering the cavity formed in the composite unibody frame.

14. The keyboard of claim 13, further comprising:
one or more additional electronic components oriented within the cavity formed in the composite unibody frame.

* * * * *